US008914972B2

(12) United States Patent
Aluffo

(10) Patent No.: US 8,914,972 B2
(45) Date of Patent: Dec. 23, 2014

(54) PRESS FOR CRIMPING METAL TERMINALS ATTACHED TO A CARRIER STRIP

(75) Inventor: Luigi Aluffo, Fubine-Alessandria (IT)

(73) Assignee: Mecal S.r.l., Fubine-Alessandria (IT)

( * ) Notice: Subject to any disclaimer, the term of this patent is extended or adjusted under 35 U.S.C. 154(b) by 48 days.

(21) Appl. No.: 13/138,067

(22) PCT Filed: Jan. 13, 2010

(86) PCT No.: PCT/EP2010/000193
§ 371 (c)(1),
(2), (4) Date: Aug. 30, 2011

(87) PCT Pub. No.: WO2010/083963
PCT Pub. Date: Jul. 29, 2010

(65) Prior Publication Data

US 2011/0302780 A1 Dec. 15, 2011

(30) Foreign Application Priority Data

Jan. 20, 2009 (IT) .............................. MI2009A0047

(51) Int. Cl.
*B23P 19/00* (2006.01)
*H01R 43/055* (2006.01)

(52) U.S. Cl.
CPC .................................... *H01R 43/055* (2013.01)
USPC ................... 29/753; 29/748; 29/751; 29/861; 29/863; 439/885

(58) Field of Classification Search
CPC ......... H01R 43/01; H01R 43/16; H01R 43/20
USPC ............ 29/861, 863, 748, 751, 753; 439/106, 439/885
See application file for complete search history.

(56) References Cited

U.S. PATENT DOCUMENTS 2,861,324 A * 11/1958 Klumpp, Jr. .................... 29/882
3,163,485 A * 12/1964 Kruitwagen et al. ......... 439/885
3,243,763 A * 3/1966 Elliott ........................... 439/867
3,455,022 A * 7/1969 Schmitz, Jr. et al. ........... 29/859

(Continued)

FOREIGN PATENT DOCUMENTS

JP 03-147287 A 6/1991
WO WO2007/100810 A 9/2007

OTHER PUBLICATIONS

PCT Search Report dated May 26, 2010.

*Primary Examiner* — Carl Arbes
(74) *Attorney, Agent, or Firm* — Hedman & Costigan, P.C.; James V. Costigan; Kathleen A. Costigan

(57) ABSTRACT

A method and a press for crimping metal terminals onto electric cables, wherein the metal terminal is retained in the centered crimping position, during the entire crimping process. To this end, the press of the invention comprises a crimping assembly (3) provided with means of controlling the knife (7) for the conductor (18) of the electric cable (19) independently or separately from the remaining knives (8,9), respectively for crimping the insulation (20) of said cable (19) and for detaching the carrier strip (21) supporting the metal terminal (17). By comparison with the known art, the method and the press of the invention offer the advantage of ensuring that the metal terminal is kept centered in the correct position for crimping, without undergoing unwanted displacement during the process of attaching to it the conductor and the insulation of the electric cable.

4 Claims, 6 Drawing Sheets

(56) References Cited

U.S. PATENT DOCUMENTS

| | | | | | |
|---|---|---|---|---|---|
| 3,641,650 | A | * | 2/1972 | Folk | 29/736 |
| 3,831,254 | A | * | 8/1974 | Weber et al. | 29/564.7 |
| 3,952,931 | A | * | 4/1976 | Weber | 225/103 |
| 4,253,234 | A | * | 3/1981 | Niles et al. | 29/882 |
| 4,335,497 | A | * | 6/1982 | Casey | 29/566.2 |
| 4,383,364 | A | * | 5/1983 | Casey | 29/863 |
| 4,398,337 | A | * | 8/1983 | Yamaguti et al. | 29/564.6 |
| 4,411,484 | A | * | 10/1983 | Casey | 439/422 |
| 4,596,440 | A | * | 6/1986 | Quam | 439/827 |
| 4,951,369 | A | | 8/1990 | Verrall | |
| 5,032,703 | A | * | 7/1991 | Henschen et al. | 219/85.22 |
| 2007/0062237 | A1 | | 3/2007 | Imgrut | |
| 2011/0302780 | A1 | * | 12/2011 | Aluffo | 29/863 |

* cited by examiner

PRESS FOR CRIMPING METAL TERMINALS ATTACHED TO A CARRIER STRIP

The present invention concerns a new method for crimping metal terminals onto electric cables. The invention extends furthermore to the press used for performing this method.

The field of the invention is that of presses used for crimping metal terminals onto electric cables. As is well-known, these presses are provided with a crimping assembly, activated by an eccentric shaft and provided with movable knives, respectively for cutting the carrier strip which supports the terminal, and for crimping the latter onto the insulation and onto the conductor.

Traditionally, the aforementioned assembly controls the simultaneous movement of all three of these knives, which are set up in advance according to the desired sequence of crimping and cutting the aforementioned terminal.

The principal disadvantage presented by the use of the known art described above is the freedom of movement which the terminal possesses, once it has been cut or detached from the respective carrier strip which supports it. In these conditions, in fact, the crimping of the terminal, carried out simultaneously with the detaching of the latter from its carrier strip, could be performed in a position not correctly centred on the respective wings which grip the conductor and the insulation, this misalignment being caused precisely by the displacement of the terminal from its correct crimping position.

WO2007/100810-A1 describes a terminal applicator device in which an arm is provided not for retaining the terminal during the crimping process, but for avoiding that the connecting part of this terminal (that is the part opposed to the carrier strip) raises, thus being misaligned with respect to the conductor.

JP03147287-A discloses a machine including means adapted for transporting an centring the terminals, but which do not retain these latter during the crimping process.

U.S. Pat. No. 4,951,369 relates to an apparatus for processing insulated wires, in which the terminal is retained at the connecting side thereof.

US2007/0062237-A1 describes a crimping device lacking of means for retaining the terminal during the crimping process.

The main object of the present invention therefore consists of providing a method which will allow the terminal to be kept in the correct position for crimping until this is completed.

It is a further object of the invention to provide the press adapted for executing the method referred to above.

These and other objects are achieved with the method and the press of claims respectively 1 and 8. Some preferred embodiments of the invention are claimed in the remaining claims.

By comparison with the known art, the method and the press of the invention offer the advantage of ensuring that the metal terminal is kept centred in the correct position for crimping, without undergoing unwanted displacement during the process of attaching to it the conductor and the insulation of the electric cable.

These and other objects, advantages and characteristics are apparent from the description which follows, of a preferred embodiment of the press according to the present invention, illustrated by way of non-limiting example in the attached drawings.

In these:

Figure 1:
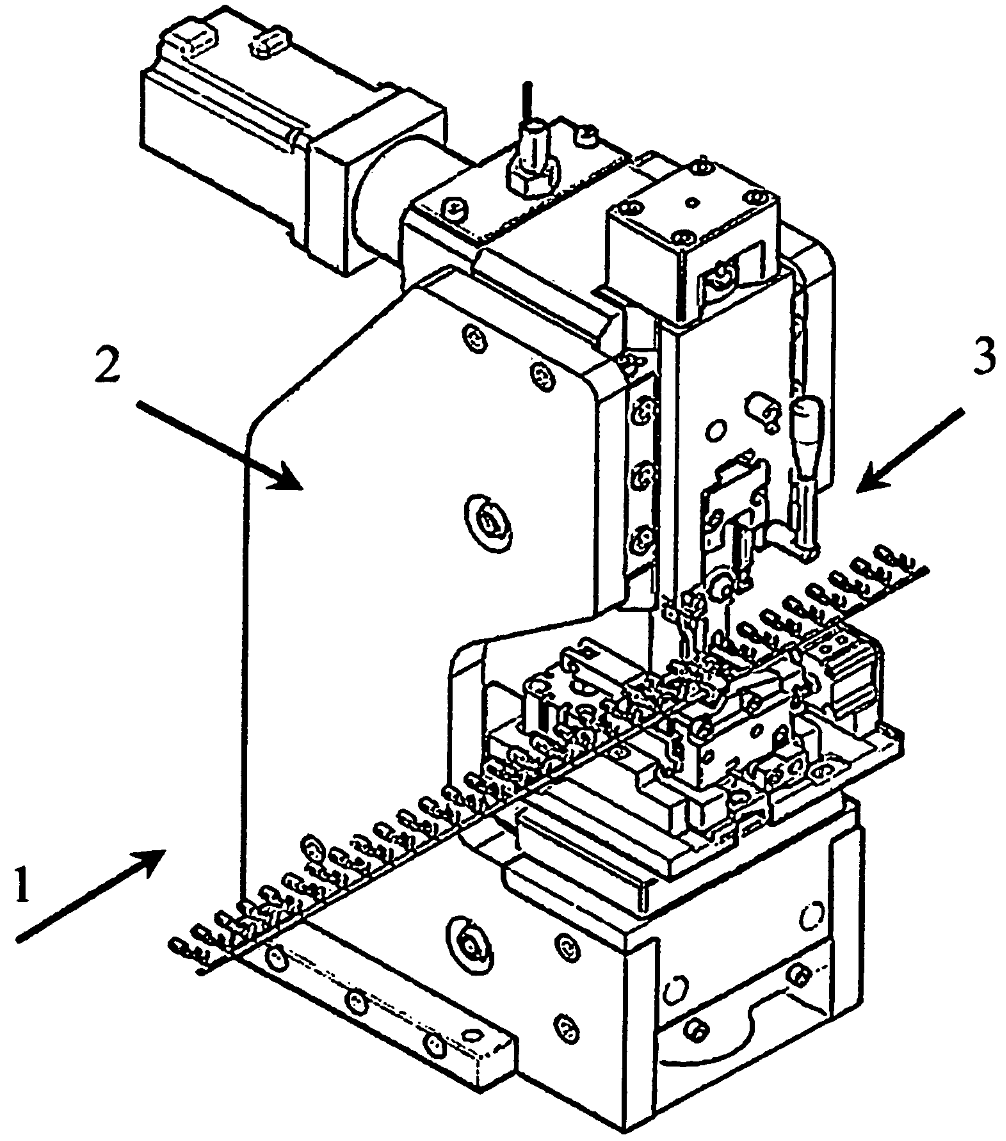
FIG. 1 illustrates the press of the invention in an overall perspective view.
Figure 2:
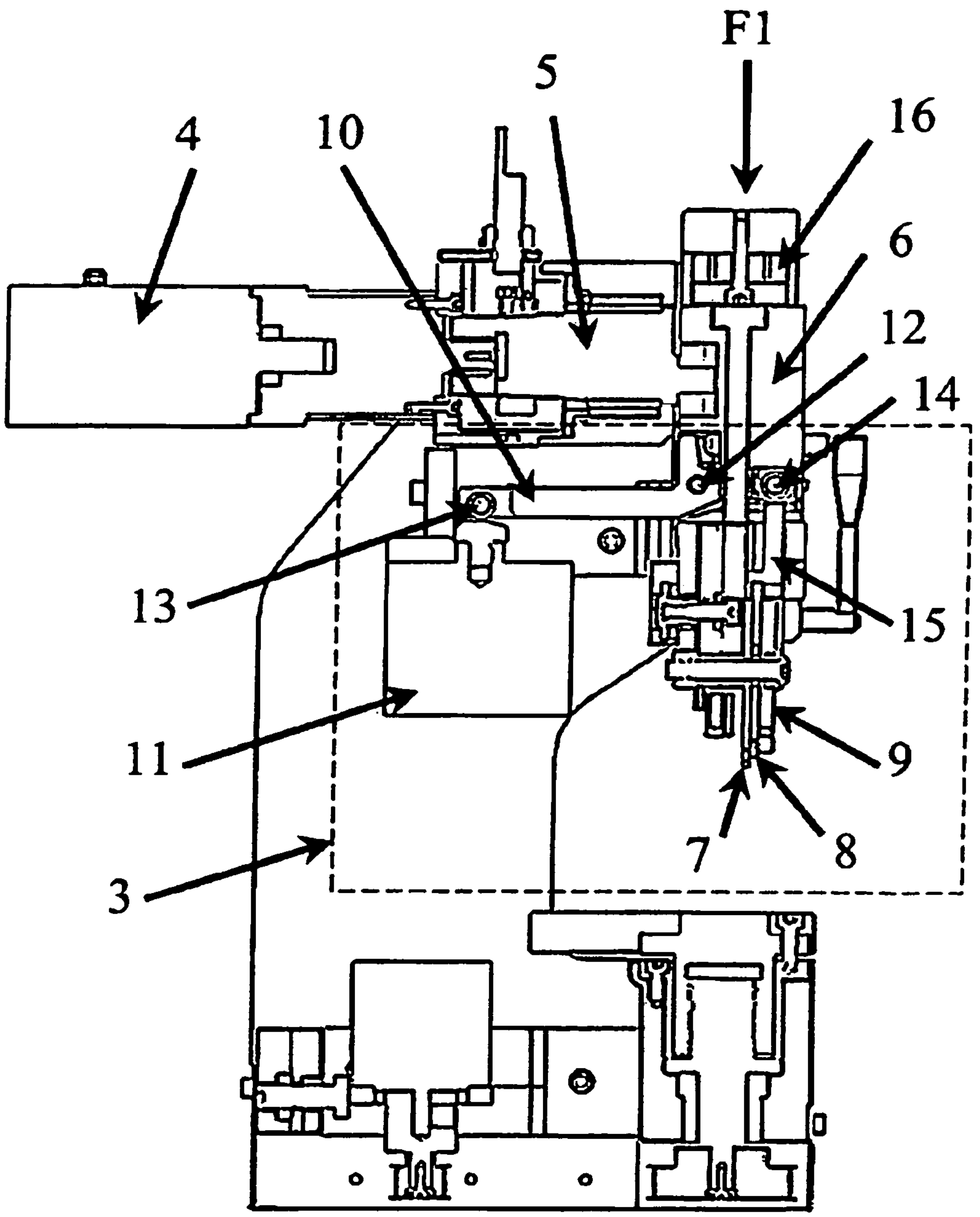
FIG. 2 illustrates the press shown in FIG. 1 in a lateral section.

The press of the invention is indicated in its entirety by 1 in FIG. 1. This consists essentially of a frame 2, on which is supported the crimping assembly 3, more clearly visible in FIG. 2. This same press 1 is also equipped with a motor 4 for operating the eccentric shaft 5, which controls a slide 6, which in its turn brings about the descent of the entire crimping assembly 3 (arrow F1 in FIG. 2), the latter being equipped with the knives, respectively 7 for crimping the conductor, 8 for crimping the insulation and 9 for cutting or detaching the carrier strip from the terminal.

The crimping assembly 3 is also provided with a lever 10, operated by an activating device 11 (cylinder or motor), which controls the descending movement of knives 8 and 9 only, respectively for the insulation and for cutting the carrier strip from the terminal. In particular the aforementioned lever 10 has a fulcrum 12 on the aforementioned slide 6, and has an extremity 13 which receives its movement from the cylinder 11, the opposite extremity 14, on the other hand, being engaged with block 15, which thrusts simultaneously on the aforementioned knives 8 and 9.

The crimping assembly 3 is also completed by a load cell 16, which receives the thrust reaction exerted on knife 7 during crimping of the conductor.

Figure 3:
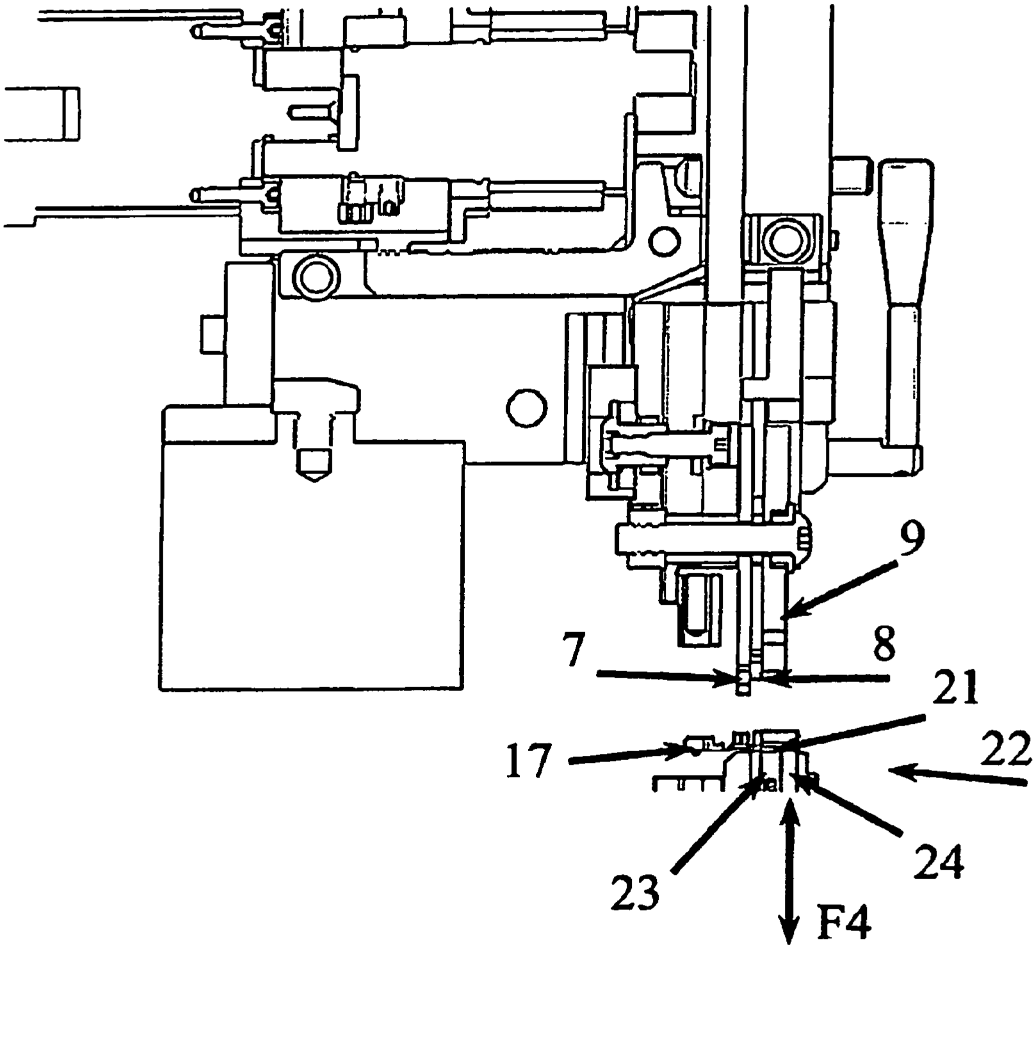
FIG. 3 illustrates the detail of the crimping assembly of the press shown in FIG. 2, in the starting position for crimping.
Figure 4:
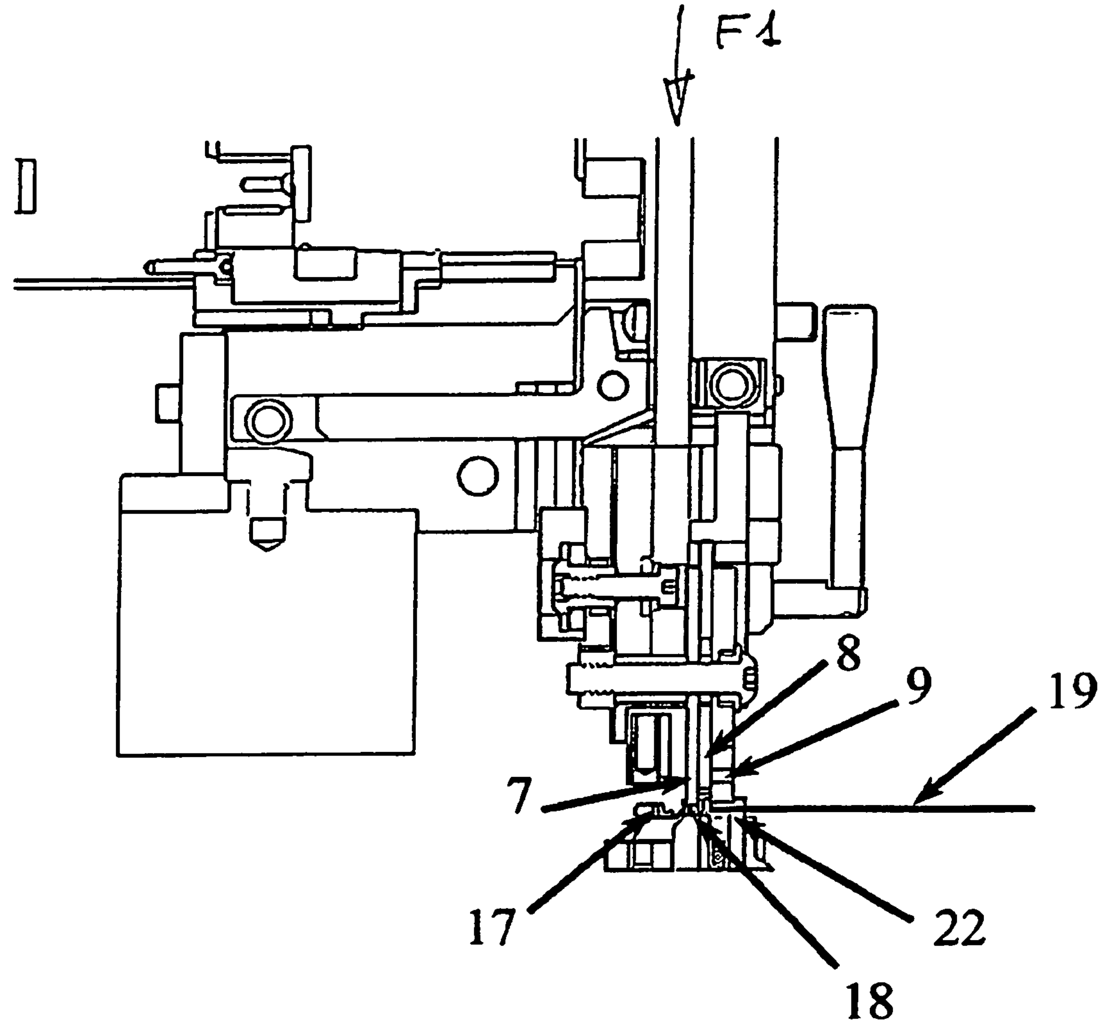
FIG. 4 illustrates the detail of the crimping assembly of the press shown in FIG. 2, in the position for crimping the conductor.

In the initial stage of crimping the metal terminal 17, illustrated in FIG. 3, knives 7, 8 and 9 are all in the raised position, while the carrier strip portion 21 of the same terminal is retained by a corresponding support 22. In particular, the aforementioned support 22 comprises a fixed part 23, with which a movable gripper 24 collaborates, suitable for clamping the carrier strip portion 21 of terminal 17. The movements of the gripper 24 in the direction of the arrows F4 shown in FIG. 3 determine the hold of this gripper on the carrier strip 21, as well as its disengagement from the latter.

Figure 5:
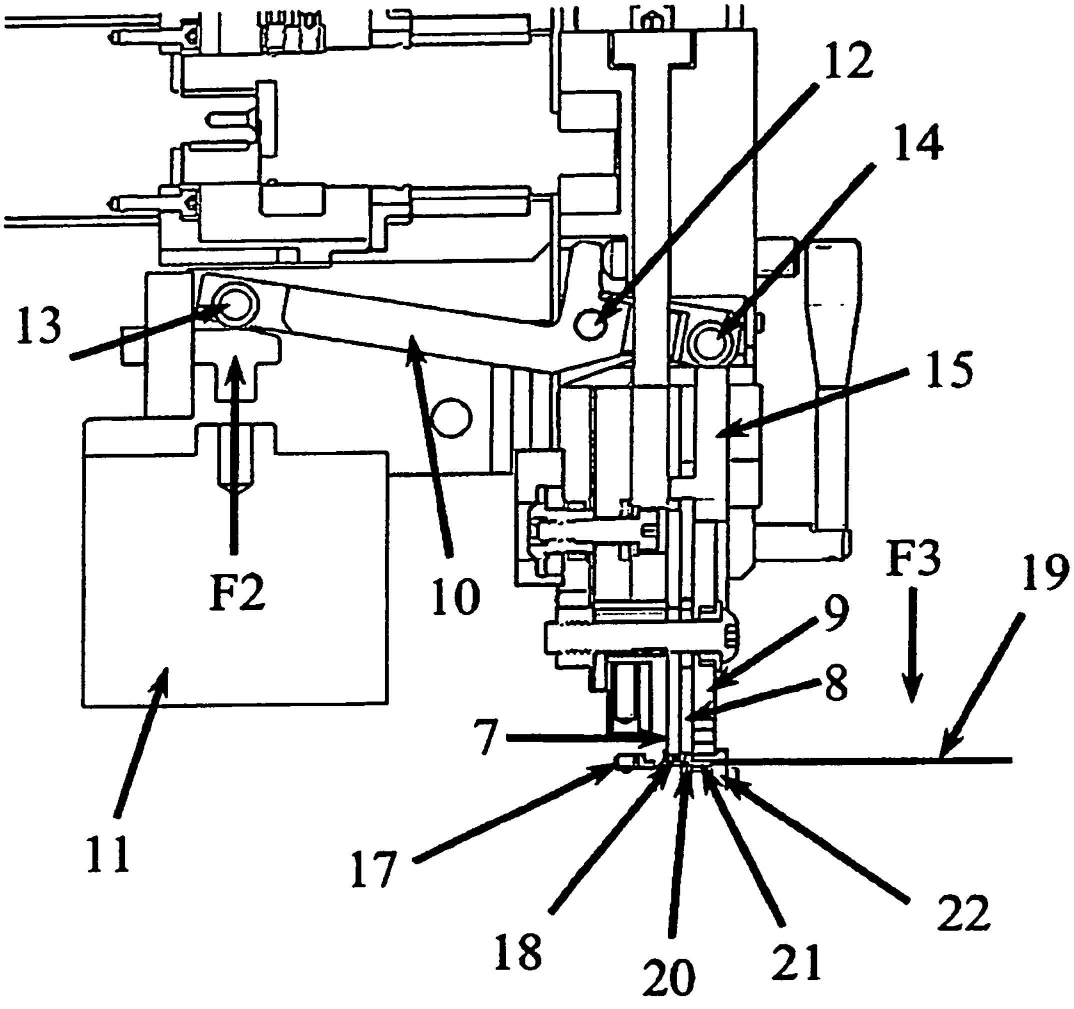
FIG. 5 illustrates the crimping assembly of the press shown in FIG. 2, in the position for crimping the insulation and detaching the carrier strip.

Subsequently, the rotation of the eccentric shaft 5 causes the entire crimping assembly to descend towards the terminal 17, at this stage causing the crimping of just the conductor 18 of the electric cable 19, performed by the corresponding knife 7. The remaining knives 8 and 9 however remain in the raised position. Then, with terminal 17 restrained in this position both by the aforementioned support 22 and by the clamping action against knife 7, the cylinder 11 brings about the activation of the lever 10 (arrow F2 in FIG. 5), whose extremity 14 moves downwards (arrow F3), bringing about the corresponding lowering of block 15 and, consequently, the lowering of the remaining knives 8 and 9. This process achieves both the crimping of the insulation 20, performed by knife 8, and the cutting of the carrier strip 21 from the terminal 17, this cut being made through the action of the corresponding knife 9.

It will be understood from the method described above that, according to the invention, metal terminal 17 is retained in its working position throughout the entire crimping cycle, in other words:

- in the initial stage, i.e. the stage of the crimping of the conductor 18 through the action of knife 7, by means of the grip of support 22 on carrier strip 21;

in the final stage, i.e. the stage of detaching the carrier strip 21 and simultaneously crimping the terminal onto the insulation, by means of the grip of knife 7 on the conductor 18 of the electric cable.

As a variant of the invention, the support 22 for the carrier strip 21 of the terminal 17 could be omitted, thus delegating to knife 7 alone, whose function is to crimp the conductor, the task of restraining the terminal itself during the subsequent operations of crimping the insulation and cutting the carrier strip.

Figure 6:
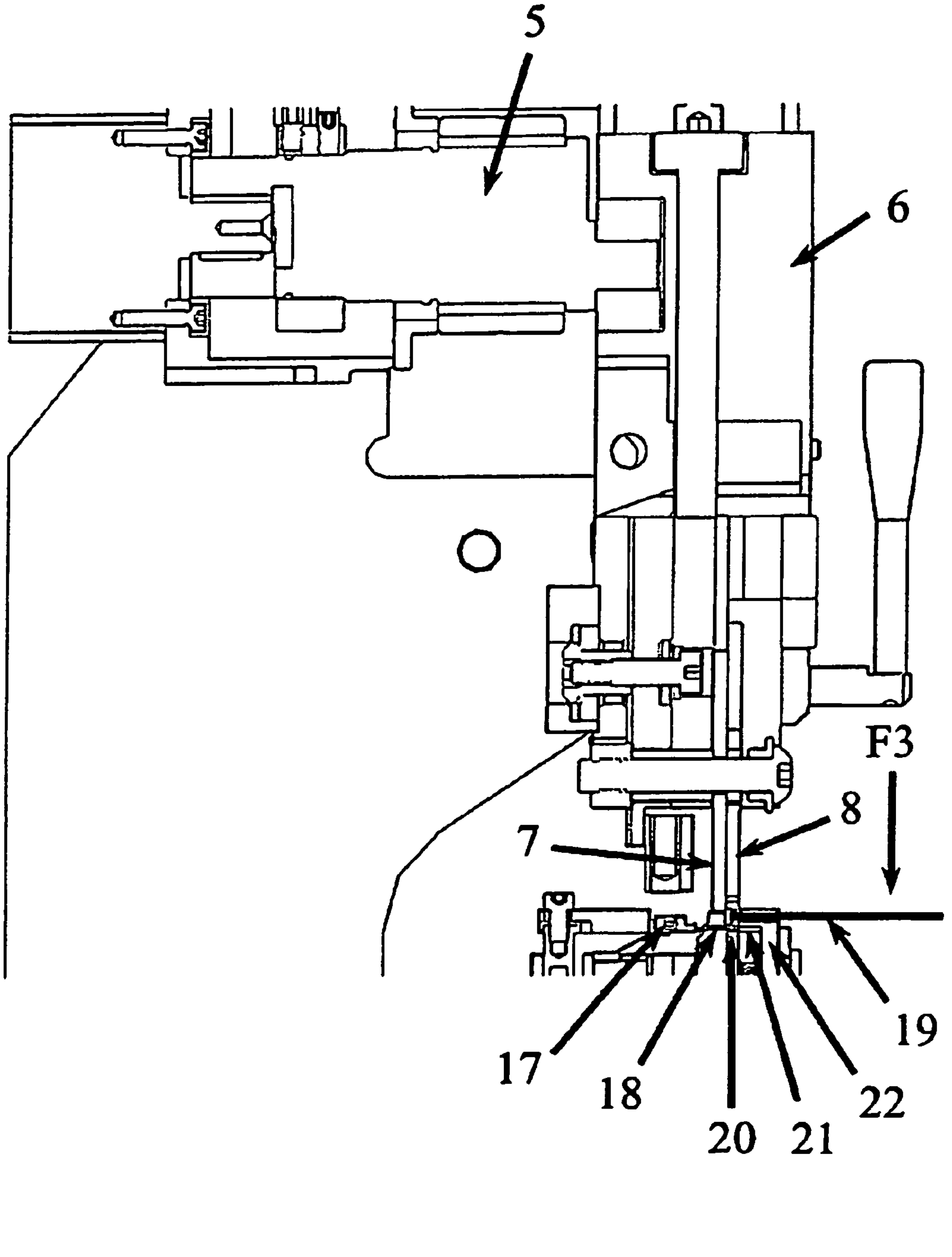
FIG. 6 shows an alternative version of the press shown in the previous pictures.

As with the version shown in FIG. 6, the press of the invention is always equipped with support 22 to keep the terminal 17 in its correct crimping position. But in this version the descending movement of knives 7 and 8 is simultaneous, while the function of knife 9 is replaced by the same support 22 which, going downward, separates the carrier strip 21 from the terminal 17 once that the complete crimping of terminal 17 over wire 19 has been performed.

With this target, the press as per the mentioned version keeps featuring slide 6 which, moved by the eccentric shaft 5, generates the simultaneous descending movement of knives 7 and 8. For the reason previously explained and with reference to the previous configuration, the knife 9 (conceived to cut the carrier strip 21) and its operating lever 10 have been omitted.

The invention claimed is:

1. Press for crimping a metal terminal (17) retained by a carrier strip portion (21) onto an electric conductor (18) and onto insulation (20) on said electric conductor (18), said press comprising a frame (2) on which is supported a crimping assembly (3) that includes a load cell (16), said press also having a motor (4) which operates an eccentric shaft (5) which controls a slide (6) that applies a reaction force F1 to cause said crimping assembly (3) to move downwardly, said crimping assembly (3) having at its lower end a first knife (7) for crimping electric conductor (18) on metal terminal (17), a second knife for crimping the insulation and a third knife for cutting a carrier strip from said metal terminal (17), said crimping assembly also being provided with a lever (10) that is operated by activating device (11), when said a subsequent stage of crimping the insulation (20) of said electric cable (19) is carried out before said carrier strip (21) is cut from said metal terminal wherein an activating device (11) is provided for operating said lever (10) wherein said activating device (11) causes said lever (10) to rotate around a fulcrum (12) by engaging a first extremity (13) of said lever (10) said lever (10) having a second extremity (14) which contacts a block (15) which operates said second and third knives (8,9).

2. Press for crimping a metal terminal (17) retained by a carrier strip portion (21) onto an electric conductor (18) and onto insulation on said electric conductor (18) and onto insulation (20) on said electric conductor (18), said press comprising a frame (2) on which is supported a crimping assembly (3) that includes a load cell (16), said press also having a motor (4) which operates an eccentric shaft (5) which controls a slide (6) that applies a reaction force F1 to cause said crimping assembly (3) to move downwardly, said crimping assembly (3) having at its lower end a first knife (7) for crimping electric conductor (18) on metal terminal (17), a second knife for crimping the insulation and a third knife for cutting a carrier strip from said metal terminal (17), said crimping assembly also being provided with a lever (10) that is operated by activating device (11), when said a subsequent stage of crimping the insulation (20) of said electric cable (19) is carried out before said carrier strip (21) is cut from said metal terminal and having a support (22) for said carrier strip portion (21) where said support is provided with a fixed part (23) which comprises a fixed part (22) and a movable gripper (24) which clamps said carrier strip portion (21), said support (22) being adapted for downward movement in response to the reaction force of thrust F1 to separate said carrier strip portion (21) from said metal terminal (17).

3. Press for crimping a metal terminal (17) retained by a carrier strip portion (21) onto an electric conductor (18) and onto insulation (20) on said electric conductor (18), said press comprising a frame (2) on which is supported a crimping assembly (3) that includes a load cell (16), said press also having a motor (4) which operates an eccentric shaft (5) which controls a slide (6) that applies a reaction force F1 to cause said crimping assembly (3) to move downwardly, said crimping assembly (3) having at its lower end a first knife (7) for crimping electric conductor (18) on metal terminal (17), a second knife for crimping the insulation and a third knife for cutting a carrier strip from said metal terminal (17), said crimping assembly also being provided with a lever (10) that is operated by activating device (11), when said a subsequent stage of crimping the insulation (20) of said electric cable (19) is carried out before said carrier strip (21) is cut from said metal terminal wherein said crimping assembly (3) is provided with means of controlling the first knife for crimping said metal terminal (17) onto said conductor (18) of said electric cable (19) independently or separately from said second and third knives (8,9) that are provided for crimping the insulation (20) of said cable (19) and for detaching the carrier strip (21) supporting the metal terminal (17) and wherein said means of controlling the first knife (7) for crimping the metal terminal (17) onto conductor (18) consist of a slide (6) driven by an eccentric shaft (5), and a separate lever (10) being provided for driving both knife (8) for crimping the insulation (20) and knife (9) for detaching the aforementioned carrier strip (21) where said separate lever (10) operates independently from said first knife (7).

4. Press according to claim 3, wherein said load cell (16) is positioned to receive said reaction force of thrust F1 received by said first knife (7) when said first knife (7) contacts the conductor (18) of the electric cable (19).

* * * * *